United States Patent [19]
Hamano

[11] 3,770,359
[45] Nov. 6, 1973

[54] APPARATUS FOR THE MANUFACTURE OF HOOK FABRIC MATERIAL FOR FASTENERS

[75] Inventor: Hisashi Hamano, Soka, Japan

[73] Assignee: International Knitlock Corporation, New York, N.Y.

[22] Filed: Sept. 25, 1972

[21] Appl. No.: 292,102

Related U.S. Application Data

[62] Division of Ser. No. 90,382, Nov. 17, 1970, Pat. No. 3,718,725.

[52] U.S. Cl............ 425/305, 425/DIG. 41, 264/322
[51] Int. Cl. ......................................... B29c 17/14
[58] Field of Search................... 425/289, 297, 302, 425/305, 393, 403, 814, DIG. 41; 264/322, 343, DIG. 66

[56] References Cited
UNITED STATES PATENTS

| 2,426,328 | 8/1947 | Wandel et al................ 425/DIG. 41 |
| 2,587,792 | 3/1952 | Von Sivers................... 264/DIG. 66 |
| 3,013,300 | 12/1961 | Gaenzle........................... 264/322 X |
| 3,133,315 | 5/1964 | Galonska........................ 425/814 X |
| 3,267,514 | 8/1966 | Porepp............................... 425/305 |
| 3,431,337 | 3/1969 | Heinberger.................... 425/814 X |
| 3,607,995 | 9/1971 | Chiba............................. 264/322 X |
| 3,673,301 | 6/1972 | Billarant ........................ 264/322 X |

*Primary Examiner*—R. Spencer Annear
*Attorney*—Dean S. Edmonds et al.

[57] ABSTRACT

Methods are disclosed including the use of heat and chemicals for converting loops upstanding from a base fabric into hook members suitable for use in hook and loop fasteners.

1 Claim, 8 Drawing Figures

APPARATUS FOR THE MANUFACTURE OF HOOK FABRIC MATERIAL FOR FASTENERS

This is a division, of application Ser. No. 90,382 filed Nov. 17, 1970, now Pat. No. 3,718,725.

BACKGROUND OF THE INVENTION

Hook and loop fasteners have found many applications and operate on the principle of having two interengaging surfaces one of loops and the other of hooks. Separation is effected by peeling one fastener element from the other. Much effort has been spent in developing various techniques for the rapid production of hooked surfaces. Conventionally, hooks are formed by cutting loops and by heat setting the monofilament materials used to form the loops thereafter. This method while satisfactory is fairly expensive and it is the purpose of the present invention to produce hooked fastener members by using inexpensive techniques other than cutting.

SUMMARY OF THE INVENTION

The present invention employs a base fabric having a series of looped piles in regular rows upstanding therefrom as a starting material. The rows of loops first are held by rods inserted therein and, in accordance with certain forms of the invention thereafter platens or rollers are to provide heat and pressure caused to pass over the upper ends of the rods thus effecting the conversion of the loops into various hooked forms. The invention further provides chemical means in combination with mechanical pressure for converting loops into hooked forms.

These and other aspects of the invention will become apparent from a detailed examination of the following description of preferred embodiments and of the accompanying drawing.

DESCRIPTION OF A PREFERRED EMBODIMENT

Figure 4:
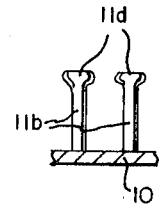
FIG. 4 illustrates the final stage of deformation of a loop into two hook-like forms.

Referring to the drawing and initially to FIGS. 1–4 thereof, there has been illustrated a base fabric 10 which may be knitted or woven and upstanding therefrom a plurality of rows of loops 11. Each of the rows of loops 11 has inserted therebetween a rod or mandrel 12 which will maintain the loops in their upstanding position. A first heated platen 13 will be passed over the tops of the loops 11 to melt the summits thereof (see FIG. 3). Thereafter, a second platen 14 of cooler temperature will be passed over the now melted ends 11a of the two upstanding legs 11b of each loop 11 to press the still molten ends into knob 11d as shown in FIG. 4.

Figure 1:
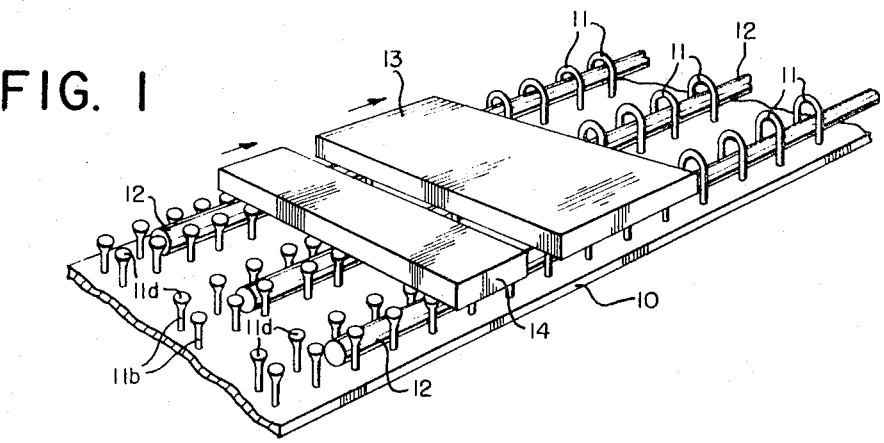
FIG. 1 is a perspective view of one application of the principles of the present invention wherein heated platens pass over the upper ends of a series of loops made of thermally deformable plastic material.
Figure 2:
FIG. 2 is a fragmentary elevational view of a loop prior to deformation thereof.
Figure 3:
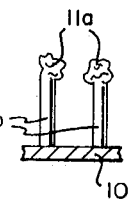
FIG. 3 illustrates an intermediate stage of deformation.
Figure 5:
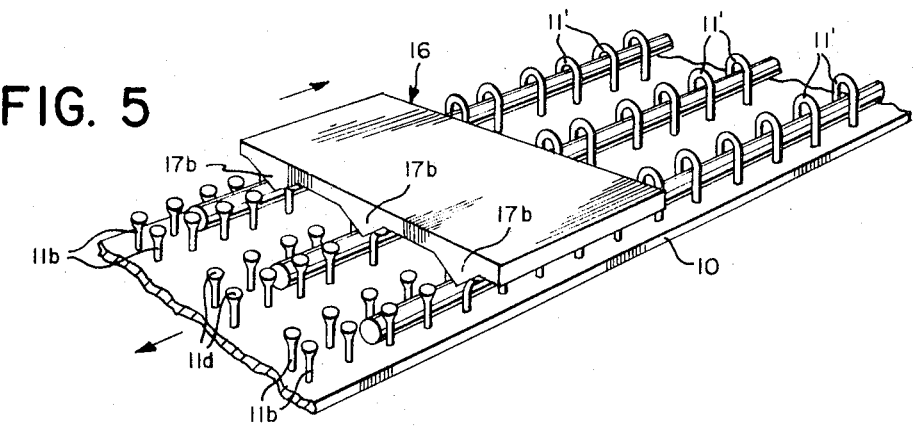
FIG. 5 is an alternate form of heated platen employing a similar method to that of FIG. 1.
Figure 6:
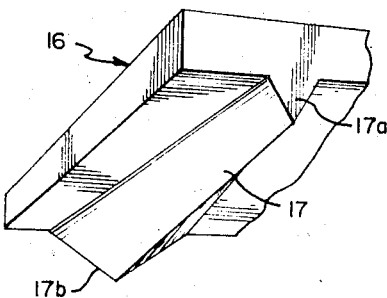
FIG. 6 is a detail showing of the platen used in the apparatus of FIG. 5.

In accordance with the apparatus of FIGS. 5 and 6, a variation of the apparatus and method of FIG. 1 has been shown. A heated platen 16 has a triangular shaped ridge 17 along the bottom thereof, the front end 17a being of sharp or fairly acute angular shape while the rear 17b of substantially flatter angular shape. The front end 17a is kept at a high temperature while the rear end 17b is kept at a lower temperature; consequently, the loops 11' will be heated and cut by the front end 17a and the passing of the rear end 17b will cause the half melted loops to be crushed to form into knob like projections such as those shown in FIG. 4.

Figure 7:
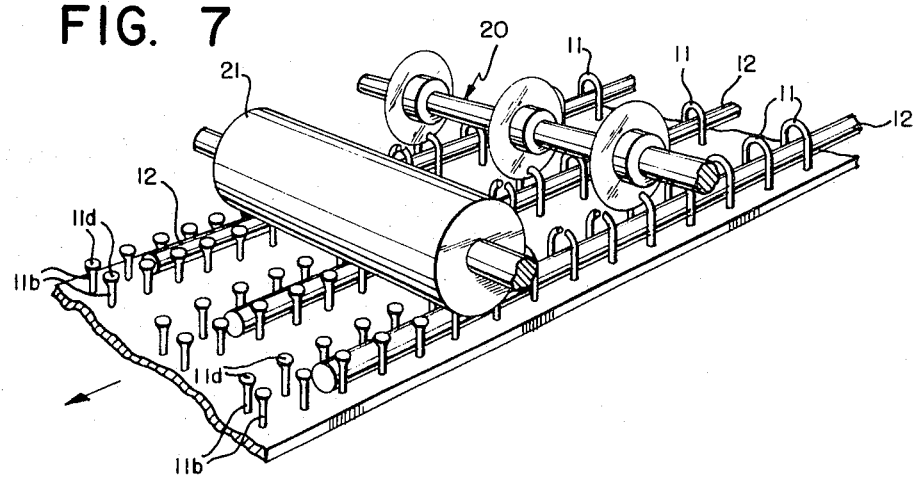
FIG. 7 is still another alternate form of apparatus to convert loops into a series of knob shaped hooks.

In accordance with the embodiment of FIG. 7, loops 11 are held by rods 12 and are first subjected to the cutting action of rotary cutter 20. Thereafter, a heated roller 21 will pass over the cut ends to melt and crush the loop ends into the configuration of FIG. 4.

Figure 8:
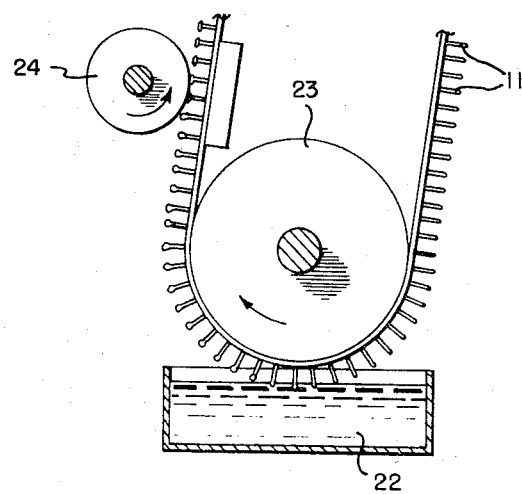
FIG. 8 illustrates the use of a chemical bath to begin initial deformation of loops.

FIG. 8 discloses an alternate method employing the use of a chemical bath 22. In accordance with this method, fabric having upstanding loops 11 has passed over a roller 23 which dips the summits of the loops 11 into a chemical solvent. For example in the case of nylon, formic acid would be used. The chemical solution half melts the tip ends of the loops thereby softening them. Thereafter, the loops will be passed beneath a pressing roller 24 which crushes the softened tip ends, the applied chemical being removed by evaporation or other suitable methods to fix the shape of the deformed tip ends.

The above methods and apparatus as disclosed will produce a pile fabric which is very suitable for use as a fastener. The hook or the knob like hooks formed will interengage with loop pile material or with other knob ended pile material.

It will be understood that the above description of preferred embodiments is merely representative and that reference should be made to the appended claims in order to appreciate the spirit and scope of the present invention.

What is claimed is:

1. An apparatus for converting a series of loops upstanding from a base fabric into upright projections having knob-like ends comprising means for maintaining said loops in an upright position, heated platen means for deforming and separating the summits of said loops and pressure plate means for crushing cooling and molding said ends into knob-like projections.

* * * * *